(12) United States Patent
Niki et al.

(10) Patent No.: US 7,686,033 B2
(45) Date of Patent: Mar. 30, 2010

(54) VALVE CONNECTOR

(75) Inventors: Nobuaki Niki, Inuyama (JP); Takahiro Nishiyama, Kasugai (JP)

(73) Assignee: Tokai Rubber Industries Ltd. (JP)

( * ) Notice: Subject to any disclaimer, the term of this patent is extended or adjusted under 35 U.S.C. 154(b) by 450 days.

(21) Appl. No.: 11/364,289

(22) Filed: Feb. 28, 2006

(65) Prior Publication Data
US 2006/0196557 A1    Sep. 7, 2006

(30) Foreign Application Priority Data
Mar. 2, 2005   (JP) .............................. 2005-056993

(51) Int. Cl.
*F16K 15/02* (2006.01)
(52) U.S. Cl. .................. 137/543.23; 137/540
(58) Field of Classification Search ............ 137/119.04, 137/375, 454.6, 493.8, 515.5, 516.27, 541, 137/542, 543.13, 523.23, 527, 516.21, 543.23, 137/543.21, 543.19, 543, 540; 251/333
See application file for complete search history.

(56) References Cited
U.S. PATENT DOCUMENTS
4,368,756 A * 1/1983 Carlson ...................... 137/541

| | | | |
|---|---|---|---|
| 4,667,697 A * | 5/1987 | Crawford | ............... 137/543.17 |
| 5,273,254 A * | 12/1993 | McNaughton et al. | ... 251/149.6 |
| 6,520,480 B2 * | 2/2003 | Martin-Cocher et al. | . 251/149.6 |
| 7,222,637 B2 * | 5/2007 | Miyajima | ................ 137/515.5 |

FOREIGN PATENT DOCUMENTS

| DE | 10048502 | 4/2002 |
|---|---|---|
| JP | 51-120950 | 4/1978 |
| JP | 2004-116733 | 4/2004 |

OTHER PUBLICATIONS

Translation of Official Action issued Sep. 22, 2006.
English Abstract of Japanese Utility Mode4I Appln. No. 51-120950.

* cited by examiner

*Primary Examiner*—John Rivell
*Assistant Examiner*—Macade Brown
(74) *Attorney, Agent, or Firm*—Andrus, Sceales, Starke & Sawall, LLP

(57) ABSTRACT

A connector housing of a valve connector integrally has a tube connecting portion on one axial end thereof, a pipe inserting portion on the other axial end thereof, and a valve housing between the tube connecting portion and the pipe inserting portion. A valve housing houses a valve body and a compression spring that biases the valve body in an axial direction into abutment with a housing inner surface. Anti-rotation ribs are provided integrally on an inner peripheral surface of the valve housing. The anti-rotation ribs abut the valve body so as to restrain the valve body from rotating.

13 Claims, 11 Drawing Sheets

VALVE CONNECTOR

BACKGROUND OF THE INVENTION

1. Field of the Invention

The present invention relates to a valve connector to be used, for example, for controlling a fuel evaporating gas (vapor) in piping such as evaporation piping or vapor return piping in a fuel supply system of a motor vehicle.

2. Description of the Related Art

In order to prevent fuel vapor gas generated in a fuel tank of a motor vehicle from being discharged into an atmosphere, a vapor discharge prevention mechanism that causes the vapor to be adsorbed in a canister has been widely employed. In this type of vapor discharge prevention mechanism, evaporation piping connecting a fuel tank and the canister uses a one-way valve or a check valve to maintain an appropriate pressure in the fuel tank by controlling a flow of the vapor. And, in the vapor discharge prevention mechanism, around a mouth of an inlet pipe and the fuel tank is connected by means of vapor return piping, a part of the vapor in the fuel tank is introduced to the mouth of the inlet pipe via the vapor return piping, and it is prevented that an external air is caught up in the mouth of the inlet pipe at fuel supply from outside. Thereby generation of the vapor is restrained. There is provided the one-way valve or the check valve in a middle portion of the vapor return piping for controlling a flow of the vapor according to an internal pressure of the fuel tank.

In this type of the evaporation piping or the vapor return piping, a rubber hose is connected to each end of the one-way valve or the check valve. And, an end portion of one rubber hose is connected to, for example, a connecting pipe on a side of a roll-over valve or a differential pressure regulating valve disposed on the fuel tank. Also, an end portion of the other rubber hose is connected to a connecting pipe on a side of the canister or a connecting pipe on a side of the inlet pipe. However, as there is a tendency to restrict strictly transpiration of a fuel from a fuel supply system, a resin tube is also used instead of the rubber hose. When the resin tube is used, in many cases, the resin tube is connected to the connecting pipe by means of a connector or a quick connector. And, under the increasing demand for low fuel transpiration in recent years, minute fuel transpiration from a connecting region between the rubber hose or the resin tube and the one-way valve, etc. cannot be ignored. So, there is a need to reduce the number of connecting regions between structural elements to lower fuel transpiration.

Accordingly, it is proposed that the one-way valve or the check valve is equipped or added in a quick connector, for example, having an inserting portion for the connecting pipe. Thereby the parts count itself, i.e. the number of parts in the evaporation piping, the vapor return piping or the like, and the number of the connecting regions between the structural elements are reduced to achieve low fuel transpiration.

A known type of quick connector, in which a one-way valve or check valve is equipped or added, comprises, for example, a connector housing that has a tube connecting portion on one axial end thereof and a pipe inserting portion on the other axial end thereof, a valve seat surface that is defined in an inner surface of the connector housing near the tube connecting portion, a valve body that is disposed in the connector housing so as to move toward and away from the valve seat surface in an axial direction, and a compression spring that is mounted in the connector housing for biasing the valve body toward the valve seat surface. Such type of quick connector is disclosed, for example, in Patent Document 1. The valve body closes the fluid flow path by abutting an abutting surface defined on an outer peripheral portion of a closing portion with the valve seat surface. The fluid flow path is opened when the valve body is subject to a fluid pressure from the one axial end and moves in a direction away from the valve seat surface.

[Patent Document 1] JP-A, 2004-116733

Meanwhile, in this type of valve connector disclosed in Patent Document 1, when a valve body is moved in an axial direction by fluid pressure change, a valve body may move while rotating with respect to a connector housing, for example, at high speed, depending on how a fluid pressure acts on the valve body. Then, responsiveness of the valve body to the fluid pressure is affected depending on how the valve body (for example, a guide) slides rotationally with respect to the connector housing, resulting in unstable pressure-flow characteristics of the valve connector. Also, the compression spring is disposed on the other axial end with respect to the valve body with one axial end portion thereof supported at the valve body. In a supporting structure of the one axial end portion of the compression spring, the one axial end portion of the compression spring is fitted in a support recess formed in each of a plurality of the guides of the valve body. So, when shock is given to the valve connector by drop of the valve connector, etc. before the valve connector is installed in a piping, or shock or the like is given by vehicle vibration, etc. after the valve connector is installed, the valve body is impulsively moved in a circumferential direction and an axial direction, there is a fear that a part of the one axial end portion of the compression spring is ejected out of the support recess of the guide, for example, so as to engage with the other axial extreme end or edge of the guide. Then, spring characteristics of the compression spring is changed, and it is no longer possible to expect desired operation of the valve connector.

Under the circumstances described above, it is an object of the present invention to provide a valve connector that can maintain, stable operating characteristics.

SUMMARY OF THE INVENTION

According to the present invention, there is provided a novel valve connector. The valve connector (connector with internal valve) comprises a connector housing that has a through-path, for example, running in an axial direction and an internal valve that is disposed in the connector housing for opening and closing the through-path. The connector housing is provided with a tube connecting portion (including a hose connecting portion, namely, a connecting portion for a mating member with a pipe) on one axial end thereof and a pipe inserting portion on the other axial end thereof. The internal valve has a valve seat surface that is defined in the connector housing, a valve body that includes a closing portion with an abutting surface for abutting with the valve seat surface on an outer peripheral portion of the closing portion, and a compression spring that biases the valve body toward the valve seat surface. The valve body is housed in the connector housing movably in the axial direction. In the valve connector, an anti-rotation mechanism is arranged between the valve body and a side of the connector housing for restraining the valve body from rotating with respect to the connector housing. The anti-rotation mechanism is configured so as never to allow rotation of the valve body in some cases, and so as to allow rotation thereof in a predetermined angular range, for example, such as 60°, 45° and 30° in some cases. For example, the anti-rotation mechanism may be provided on a side of the connector housing. Meanwhile, as the case may be, the connector housing is configured such that the tube connecting portion overlaps the pipe inserting portion.

In order to prevent that the valve body tilts during movement in the connector housing and is disturbed from smooth opening and closing operation, the valve body is preferably provided with a plurality of guides, for example, extending in the axial direction, in circumferentially spaced relation, which are slidable and movable over an inner surface of the connector housing. Even when such guides are provided, since rotation of the valve body is restrained by the anti-rotation mechanism, pressure-flow characteristics of the valve connector does not become unstable. And, in such case, in order to facilitate simple construction of the anti-rotation mechanism, it is advantageous to configure the anti-rotation mechanism in a form of an anti-rotation projection projecting from the connector housing so as to engage with the guide in a circumferential direction. For example, the guide may be regarded to comprise a part of the anti-rotation mechanism. And, in order that a supporting structure of an end portion of the compression spring is configured, each of the guides may include a support recess, and the end portion (an end portion along the axial direction) of the compression spring may be received in the support recess.

When a valve body housing portion (a portion housing the valve body) of the connector housing has a large diameter, a portion of the pipe inserting portion adjacent to the valve body housing portion necessarily has a diameter that is larger than a pipe, and supporting function with respect to an inserting end portion of the pipe when the pipe is inserted in the connector housing is lost. In such case, it is effective to fit a cylindrical bush in the pipe inserting portion for filling in between an inner peripheral surface of one axial end (one end in a direction of an axis of the pipe inserting portion, the connector housing or the valve connector) of the pipe inserting portion and the inserting end portion of the pipe that is inserted therein. Here, the anti-rotation mechanism may be configured in a form of an anti-rotation projection projecting from the cylindrical bush so as to engage with the guide in the circumferential direction. The guides are provided, for example, on the other axial end (the other end in a direction of an axis of the valve body, the connector housing or the valve connector) of the valve body. And, may be applied such supporting structure where the one axial end portion of the compression spring is received in the support recess formed in each of the guides and the other axial end portion thereof is supported by the cylindrical bush or at the cylindrical bush.

In order to prevent that durable life of the internal valve or internal valve mechanism is reduced due to wear of the anti-rotation projection, etc., preferably, a plurality of the anti-rotation projections are provided in circumferentially spaced relation. It is effective to configure the valve body to move rotationally or rotate, or to be allowed to move rotationally or rotate in a predetermined angular range or a certain angular range. It is possible to configure the anti-rotation mechanism such that all of the anti-rotation projections or all of the guides simultaneously abut the guides or the anti-rotation projections. Here, for example, both of the anti-rotation projections and the guides are equally spaced in the circumferential direction, respectively. And, for example, the equal number of the anti-rotation projections and the guides are provided. Or, for example, the number of either ones of the anti-rotation projections or the guides to be provided is an integral multiple of the other ones of the anti-rotation projections or the guides. And, in order to reduce sliding resistance of the valve body with respect to movement in the axial direction, it is possible to configure the anti-rotation mechanism so as to allow reduced number of a pair of the anti-rotation projection and the guide in abutment relation simultaneously, for example, so as to allow only single pair in abutment relation any time. Here, for example, a configuration may be such that the anti-rotation projections and the guides are equally spaced in the circumferential direction, respectively, but the number of either ones of the anti-rotation projections or the guides to be provided is different from that of the other ones, and is not equal to an integral multiple of the other ones. And, a configuration may be such that either ones of the anti-rotation projections or the guides are equally spaced in the circumferential direction, while the other ones are unequally spaced in the circumferential direction. In order to facilitate simple configuration of the anti-rotation mechanism, the anti-rotation projections may be unequally spaced in the circumferential direction. Meanwhile, the phrase "unequally spaced in the circumferential direction" means cases except for the case that all spacings or angular spacings in the circumferential direction are the same".

As described above, in a valve connector or connector including an internal valve according to the present invention, a valve body is restrained from free rotation or free rotational movement and thereby valve characteristics as expected can be always secured stably.

Now, the preferred embodiments of the present invention will be described in detail with reference to the drawings.

BRIEF DESCRIPTION OF THE DRAWINGS

FIG. 6 (B) is a view showing abutment relation between the anti-rotation projections and first slide legs of FIG. 6 (A).

FIG. 7 (B) is a view showing abutment relation between anti-rotation projections and first slide legs of FIG. 7 (A).

DETAILED DESCRIPTION OF THE PREFERRED EMBODIMENTS

Figure 1:
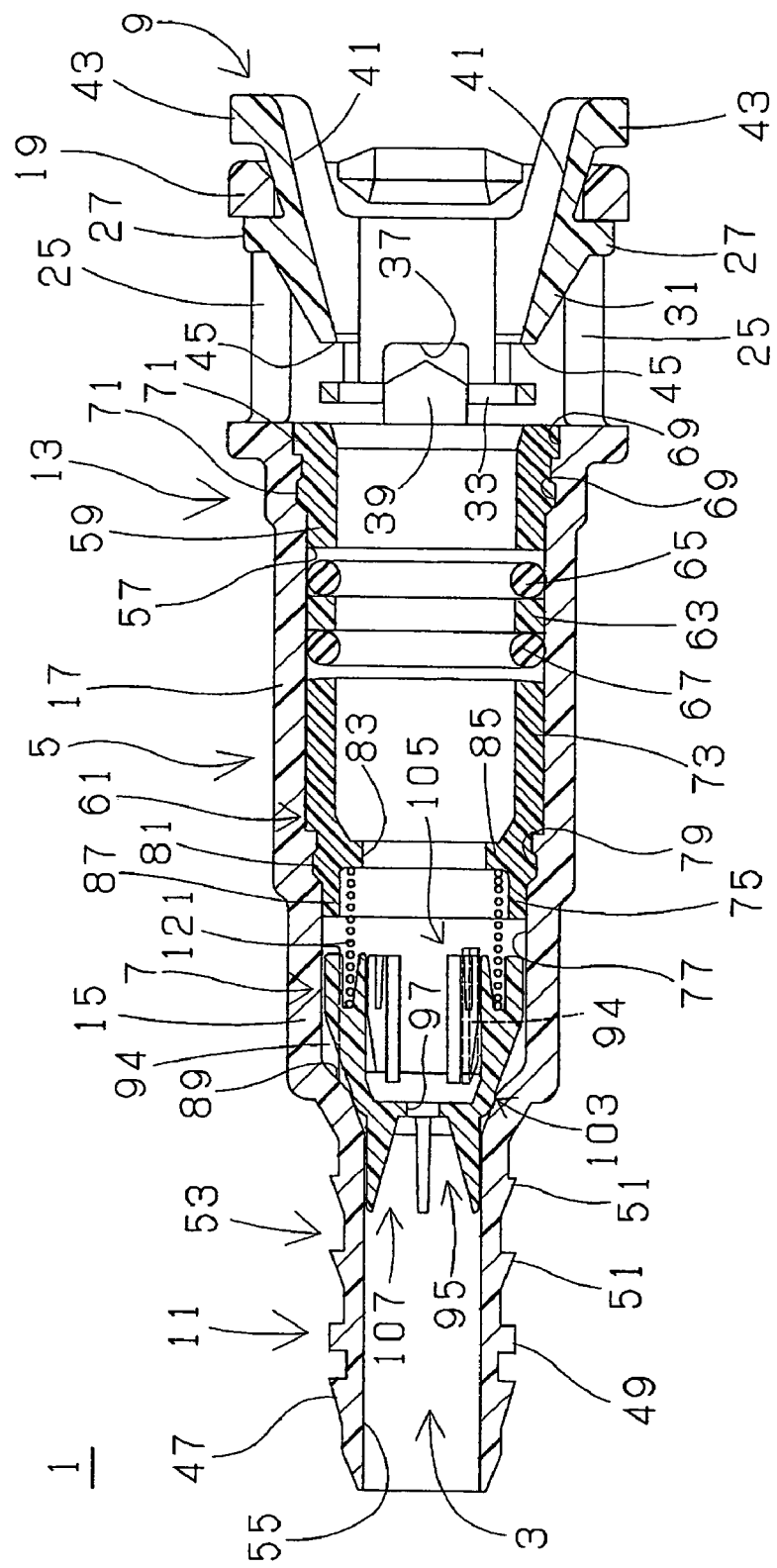
FIG. 1 is a sectional view of a valve connector according to the present invention.
Figure 2:
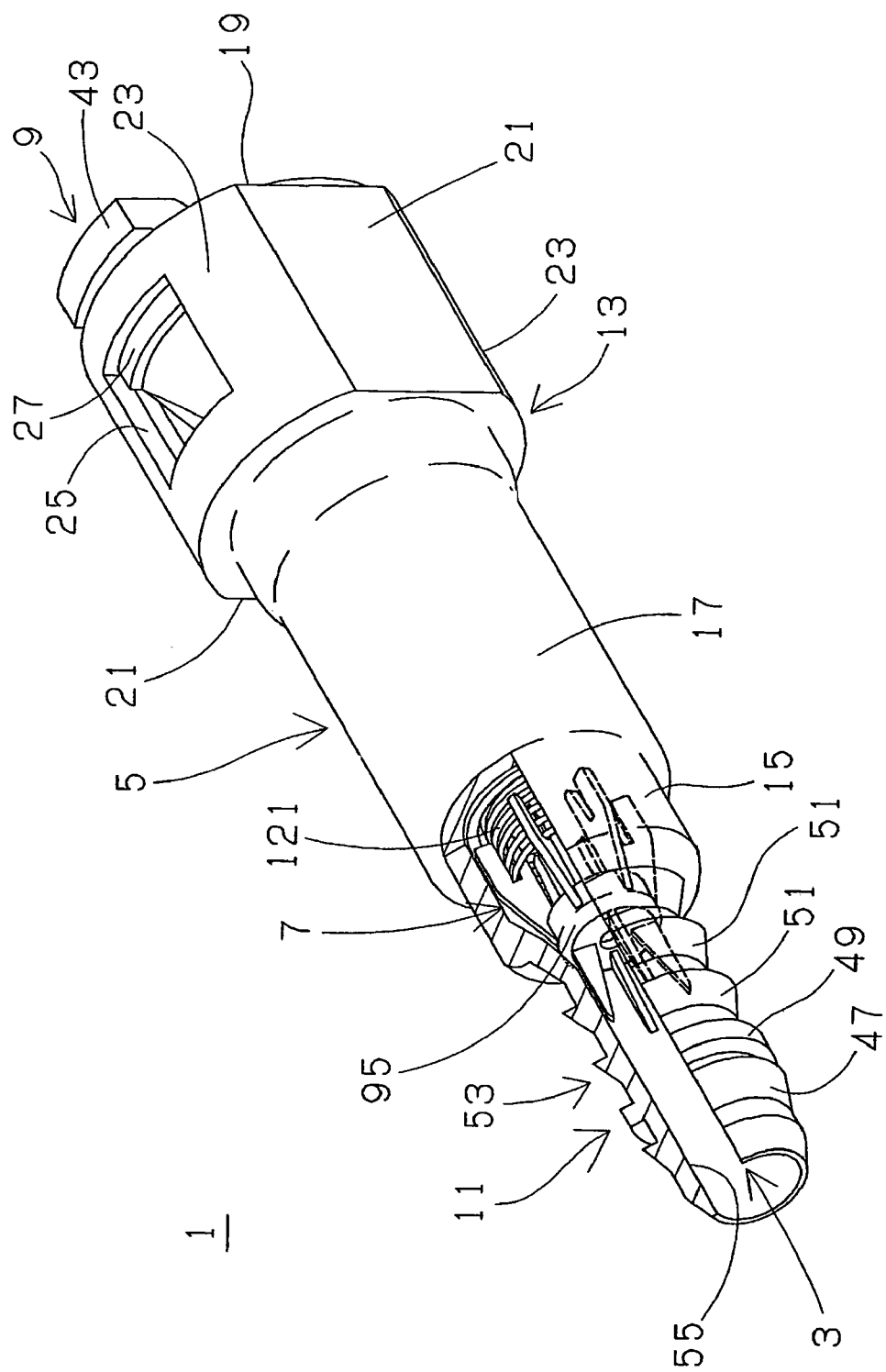
FIG. 2 is a partly broken perspective view of the valve connector.

A valve connector 1 as shown in FIGS. 1 and 2 is used, for example, for evaporation piping or vapor return piping of a tank of fuel such as gasoline, etc., to control flow of a vapor. The valve connector 1 comprises a connector housing 5 having a through-path or through-bore 3 running in an axial direction, an internal check valve 7 fitted and incorporated in the connector housing 5, and a retainer 9 fitted to the connector housing 5. The connector housing 5 is made of glass fiber reinforced polyamide (PA/GF), for example, glass fiber reinforced nylon 6. The retainer 9 is made of polyamide (PA), for example, nylon 12. The connector housing 5 integrally has a tube connecting portion 11 of a small diameter on one axial end thereof, a pipe inserting portion 13 on the other axial end thereof, and a valve housing 15 between the tube connecting portion 11 and the pipe inserting portion 13. The pipe inserting portion 13 integrally includes a pipe support portion 17 on one axial end thereof, and a retainer holding portion 19 on the other axial end thereof for housing and holding the retainer 9.

Figure 3:
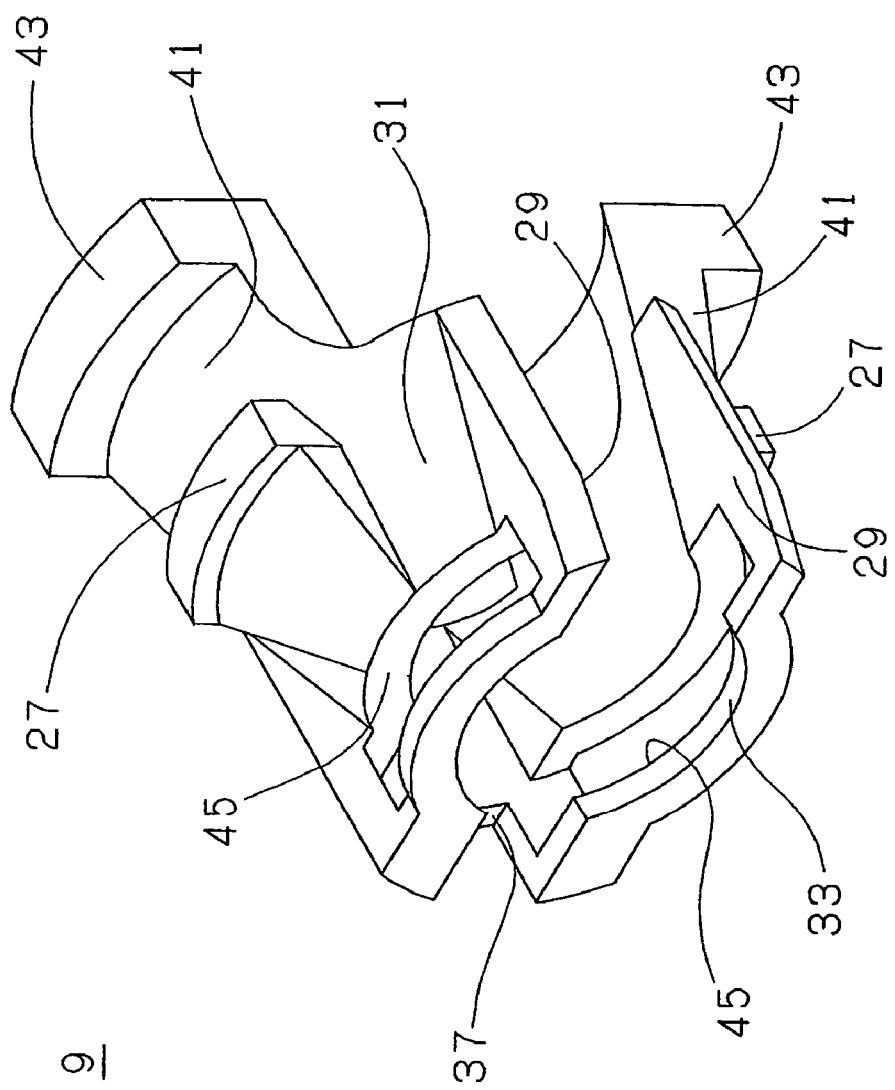
FIG. 3 is a perspective view of a retainer.

The retainer holding portion 19 of the connector housing 5 has a peripheral wall that defines planar portions 21, 21 with flat outer surfaces at diametrically symmetrical positions and arcuate portions (outer surfaces are also arcuate in cross-section) 23, 23 that are formed with engaging windows 25, 25 in diametrically opposed relation to each other. The retainer 9 that is received in the retainer holding portion 19 is relatively flexible, and is formed so as to be resiliently deformable. As shown in FIG. 3, the retainer 9 has a main body 31 of C-shape in cross-section, wherein a relatively large space for deformation is defined between circumferential opposite end portions 29, 29 thereof. The main body 31 is provided with a pair of engagement tabs 27, 27 projecting radially outward at diametrically symmetrical positions of the other axial end portion thereof. An inner surface of the main body 31, except for the circumferential opposite end portions 29, 29 and a region diametrically opposed to the space for deformation, is tapered in a direction toward one axial end or one axial direction so as to diametrically contract gradually. And, except for the circumferential opposite end portions 29, 29 and the region diametrically opposed to the space for deformation, one axial end portion 33 of the main body 31 is formed with an inner diameter almost equal to an outer diameter of a pipe 35 (refer to FIG. 9). The region of the main body 31 diametrically opposed to the space for deformation has an inner surface like a part of a cylindrical inner surface. The one axial end portion 33 of the region of the main body 31 diametrically opposed to the space for deformation is formed with a cut-out indent 37. A rotation preventive projection 39 that is formed on one axial end portion of an inner peripheral surface of the retainer holding portion 19 seats in the cut-out indent 37 to restrain rotational movement of the retainer 9 in the retainer holding portion 19.

On the other axial end portion of the main body 31 of the retainer 9, a pair of operating arms 41, 41 are formed integrally at circumferential positions corresponding to the engaging tabs 27, 27 so as to extend at angle toward radially outward in the other axial direction, respectively. Each of the operating arms 41, 41 has a latching end 43 projecting radially outward on the other axial end portion thereof. The one axial end portion 33 of the main body 31 is formed with engaging slits 45, 45 extending in a circumferential direction in opposed relation with each other. Thus configured retainer 9 is inserted and fitted in the retainer holding portion 19 such that the engaging tabs 27, 27 seat in the engaging windows 25, 25 of the retainer holding portion 19 and the latching ends 43, 43 engage with the other axial end thereof.

The tube connecting portion 11 of the connector housing 5 comprises one axial end portion 47 of right triangle sectional shape having an outer peripheral surface diametrically expanding gently toward the other axial direction, and the other axial end portion 53 having an outer peripheral surface extending like a generally simple cylindrical outer shape or outer surface on the other axial end with respect to the one axial end portion 47. The other axial end portion 53 is provided on the outer peripheral surface thereof with an annular projecting stop portion 49 of rectangular sectional shape and two annular projecting stop portions 51, 51 of right triangle sectional shape diametrically expanding toward the other axial end. The annular projecting stop portions 49, 51, 51 are arranged in axially spaced relation sequentially from one axial end to the other axial end of the other axial end portion 53. The tube connecting portion 11 includes an inner peripheral surface 55 that extends as a simple cylindrical inner surface of a small diameter and defines one axial end of the through-path 3. Usually, a tube is fitted on the tube connecting portion 11 for an entire length thereof.

The pipe support portion 17 of the connector housing 5 includes an inner peripheral surface 57 that extends as a generally simple cylindrical inner surface of a large diameter, and defines a portion toward the other axial end of the through-path 3. In the inner peripheral surface 57 of the pipe support portion 17, an annular bush 59 made of PA/GF, for example, glass fiber reinforced nylon 12 is fitted on the other axial end portion thereof, and a tubular or cylindrical bush 61 made of polyacetal (POM) or glass fiber reinforced nylon 12 is fitted on the one axial end thereof. Further, between the annular bush 59 and the tubular bush 61 in the inner peripheral surface 57, a first O-ring 65 and a second O-ring 67 are fitted with an intervening collar 63 made of POM or grass fiber reinforced nylon 12 therebetween. Fixing grooves 69 are formed in the other axial end portion of the inner peripheral surface 57 of the pipe support portion 17, while engaging ribs 71 are formed on an outer peripheral surface of the annular bush 59. The annular bush 59 is mounted to the pipe support portion 17 so as not to be allowed to move in the axial direction due to fit-in relation of the engaging ribs 71 and the fixing grooves 69. The cylindrical bush 61 has a generally simple cylindrical bush body 73 and a valve cap 75 that is integrally connected to and formed on one axial end or one axial extreme end of the bush body 73. The valve cap 75 comprises a part of the internal check valve 7. The bush body 73 is fitted in the inner peripheral surface 57 of the pipe support portion 17, and the valve cap 75 is located so as to protrude in the valve housing 15. The annular bush 59 and the bush body 73 of the tubular bush 61 have a generally identical inner diameter. For material of the first O-ring 65 on the other axial end, used is fluorosilicone rubber (FVMQ) that is excellent in waterproof and dust proof properties, and has excellent low-temperature resistance and ozone resistance. And, for material of the second O-ring 67 on the one axial end, used is fluoro rubber that is excellent in waterproof and dust proof properties, and has excellent fuel-resistance such as resistance to gasoline and ozone resistance.

The valve housing 15 of the connector housing 5 includes an inner peripheral surface 77 that extends as a generally simple cylindrical inner surface and defines an axial middle portion of the through-path 3. The inner peripheral surface 77 is slightly smaller than the inner peripheral surface 57 of the pipe support portion 17 of the pipe inserting portion 13 in diameter, and sufficiently larger than the inner peripheral surface 55 of the tube connecting portion 11 in diameter. A fixing groove 79 is formed in the other axial end portion of the inner peripheral surface 77 of the valve housing 15, while an engaging rib 81 is formed on an outer peripheral surface of the valve cap 75. The tubular bush 61 is mounted to the pipe inserting portion 13 or the pipe support portion 17 (or the pipe support portion 17 and the valve housing 15) so as not to be allowed to move in the axial direction due to contact of an outer surface (an annular outer end surface) of one axial end of the bush body 73 with an inner surface (an annular inner end surface) of one axial end of the pipe support portion 17 and fit-in relation of the engaging rib 81 and the fixing groove

79. The valve cap 75 has an annular spring bearing portion 85 formed integrally on the one axial end of the bush body 73 and expanding radially inward from the one axial end of the bush body 73, and a cylindrical portion 87 extending slightly in the one axial direction integrally from an outer periphery of the spring bearing portion 85. The spring bearing portion 85 includes a communication channel 83 in an inner periphery thereof.

Figure 4:
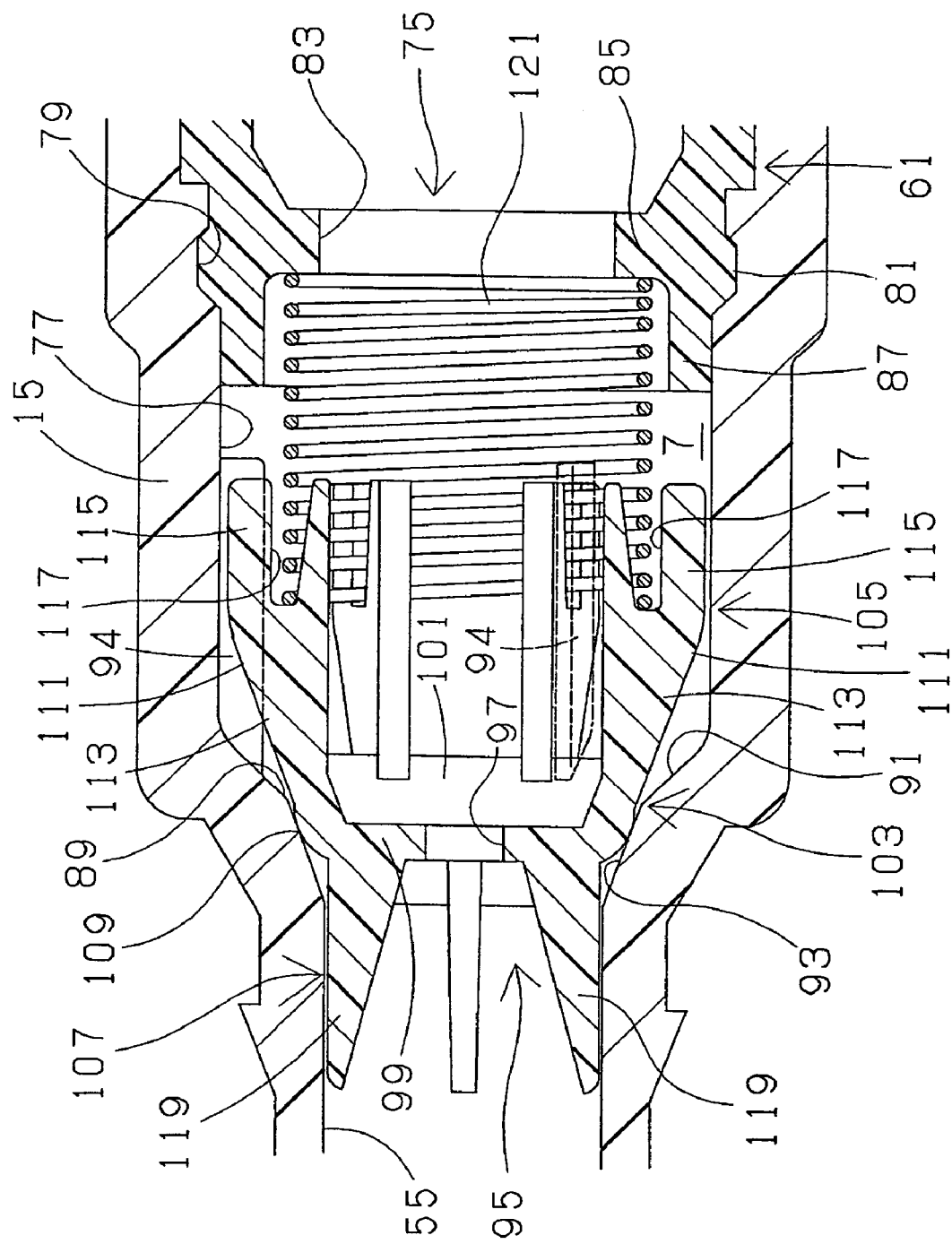
FIG. 4 is an enlarged sectional view of a region of an internal check valve.

With reference to FIG. 4, a housing inner peripheral surface 89 between the valve housing 15 and the tube connecting portion 11 has a first annular surface 91 extending from one axial end or one axial extreme end of the inner peripheral surface 77 of the valve housing 15 in the direction toward one axial end or one axial direction so as to diametrically contract in a tapered manner at a steep angle, and a second annular surface 93 extending from one axial end or one axial extreme end of the first annular surface 91 to the other axial end or the other axial extreme end of the inner peripheral surface 55 of the tube connecting portion 11 so as to diametrically contract in the tapered manner at a gentle angle. The first annular surface 91 and the second annular surface 93 have a generally identical axial length. The second annular surface 93 functions as a valve seat surface of the internal check valve 7. The inner peripheral surface 77 of the valve housing 15 integrally has three anti-rotation ribs 94 (anti-rotation projections) extending from one axial end or one axial extreme end thereof (more specifically, from an axial middle position of the first annular surface 91) generally to an axial center thereof, more specifically, close to one axial end or one axial extreme end of the cylindrical portion 87 of the valve cap 75, spaced in a circumferential direction (also refer to FIG. 6). Meanwhile, the first annular surface 91 and the second annular surface 93 may be configured to extend at an identical angle and define a single tapered surface as the valve seat surface.

Figure 5:
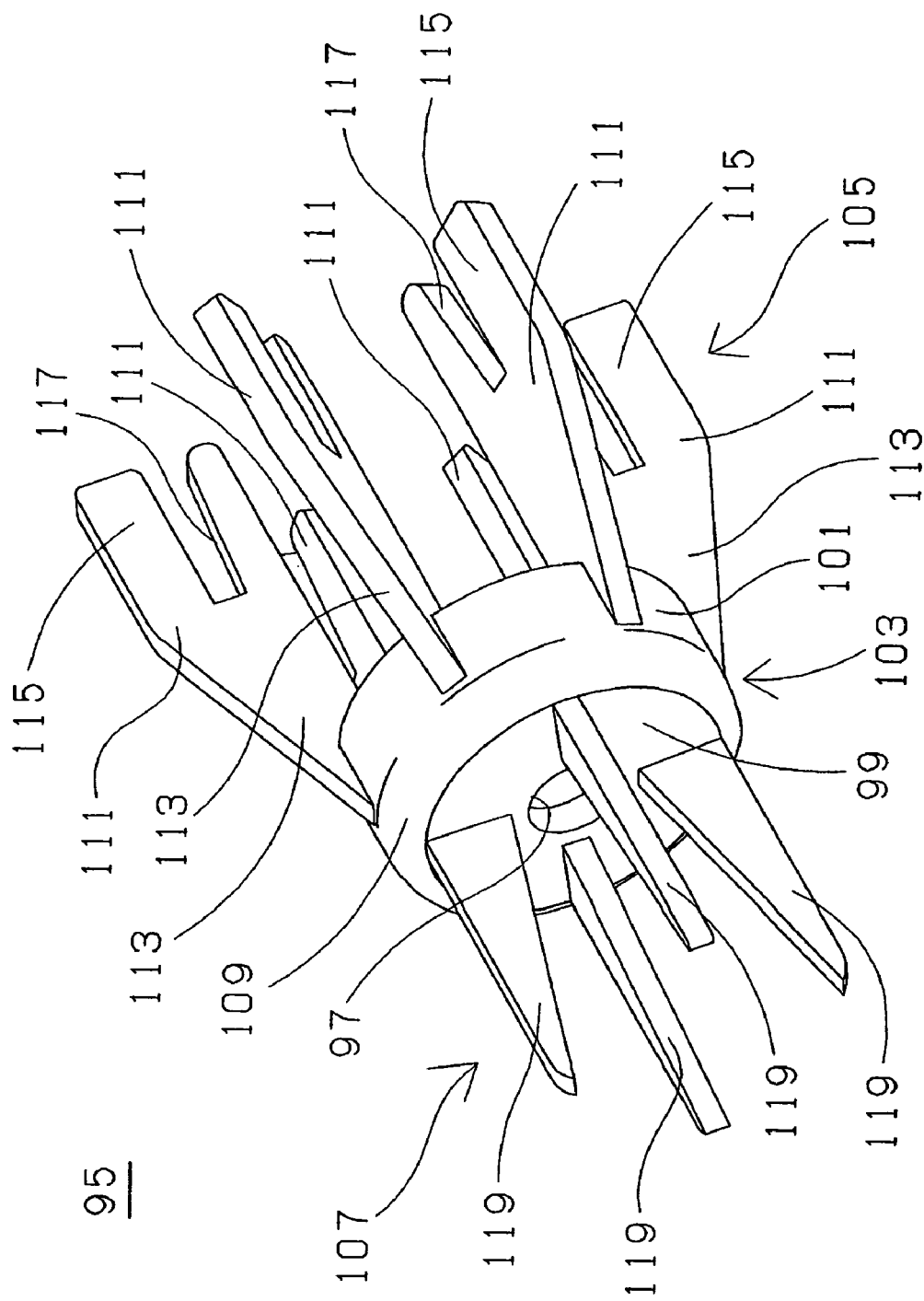
FIG. 5 is a perspective view of a valve body.

In the valve housing 15, the valve body 95 that comprises a part of the internal check valve 7 is housed. With reference to FIG. 5, the valve body 95 integrally has a closing portion 103, a first guide structure 105 and a second guide structure 107. The closing portion 103 integrally includes a thin-walled disk portion 99 that has a small through-bore 97 at the center thereof, and an annular portion 101 extending short in the direction away from the valve seat surface, i.e., in the direction toward the other axial end or the other axial direction on an outer periphery of the disk portion 99. The first guide structure 105 is formed on the annular portion 101 of the closing portion 103 so as to extend in the other axial direction, and the second guide structure 107 extends in the one axial direction from the outer periphery of the disk portion 99 of the closing portion 103. For material of the valve body 95, POM is used. An outer peripheral surface (connecting outer peripheral surface) 109 of a connecting region of the disk portion 99 and the annular portion 101, is formed so as to have an arcuate cross-section raised outward, and defines an abutment surface abutting with the second annular surface 93 (the valve seat surface) of the housing inner peripheral surface 89 that is formed in straight-line cross-section. Meanwhile, when an internal valve is configured to function as simple check valve, the small through-bore 97 is not provided.

As well shown in FIG. 5, the first guide structure 105 has six first slide legs (guides) 111 shaped like plate or sheet that are integrally arranged equally spaced (specifically, spaced at 60°) in a circumferential direction on the annular portion 101. Each of the first slide legs 111 has a support portion 113 formed on the annular portion 101, and a rectangular slide portion or first slide portion 115 integrally formed continuously on the other axial end or the other axial extreme end of the support portion 113. The guide or the first slide leg 111 is arranged such that a plate thickness direction of the first slide leg 111 corresponds to a tangential direction with respect to the annular portion 101. A radial distance from a center of the annular portion 101 to a radially outer end surface of each first slide portion 115 is designed generally equal to a radius of the inner peripheral surface 77 of the valve housing 15, or slightly smaller than the radius of the inner peripheral surface 77 of the valve housing 15. The radially outer end surface of the first slide portion 115 is formed in a surface extending in the axial direction so as to slidingly move over the inner peripheral surface 77 of the valve housing 15. In each of the first slide portions 115, defined is a support recess 117 extending from the other axial end or the other axial extreme end thereof in the one axial direction. The support recess 117 is arranged at a radial position generally identical to that of the annular portion 101.

The second guide structure 107 has four second slide legs 119 like plate that are integrally arranged equally spaced (specifically, spaced at 90°) in a circumferential direction on the outer periphery of the disk portion 99. Each of the second slide legs 119 is arranged such that a plate thickness direction of the second slide legs 119 corresponds to a tangential direction with respect to the disk portion 99. The second slide leg 119 is formed in a right triangle that includes radially outer end or outer end surface extending in the axial direction, for example, without tilting. A radial distance from a center of the disk portion 99 to the radially outer end, the radially outer extreme end or a radially outer end surface of each second slide portion 119 is designed generally equal to a radius of the inner peripheral surface 55 of the tube connecting portion 11, or slightly smaller than the radius of the inner peripheral surface 55 of the tube connecting portion 11. The radially outer end surface of the second slide leg 119 is formed so as to slide over the inner peripheral surface 55 of the tube connecting portion 11.

Thus configured valve body 95 is biased in the one axial direction by a compression coil spring 121 such that the second guide structure 107 enters in the through-path 3 of the tube connecting portion 11 and the connecting outer peripheral surface 109 of the closing portion 103 abuts the second annular surface 93 at an axially center position thereof. One axial end portion of the compression coil spring 121 is received in the support recesses 117 formed in the first slide portions 115 of the first slide legs 111, and the other axial end or the other axial extreme end thereof abuts the spring bearing portion 85 (one axial end surface of the spring bearing portion 85) of the valve cap 75. The cylindrical portion 87 of the valve cap 75 functions to hold the other axial end portion of the compression coil spring 121 while receiving it therein.

Figure 6A:
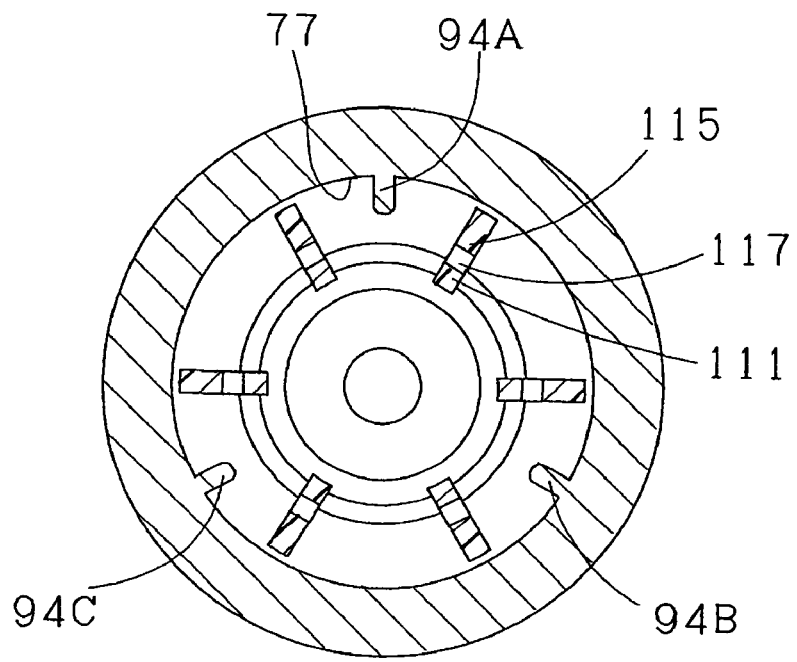
FIG. 6 (A) is an enlarged sectional view of a region of the internal check valve taken along a radial direction, and schematically showing a relationship between the valve body and anti-rotation projections.
Figure 6B:
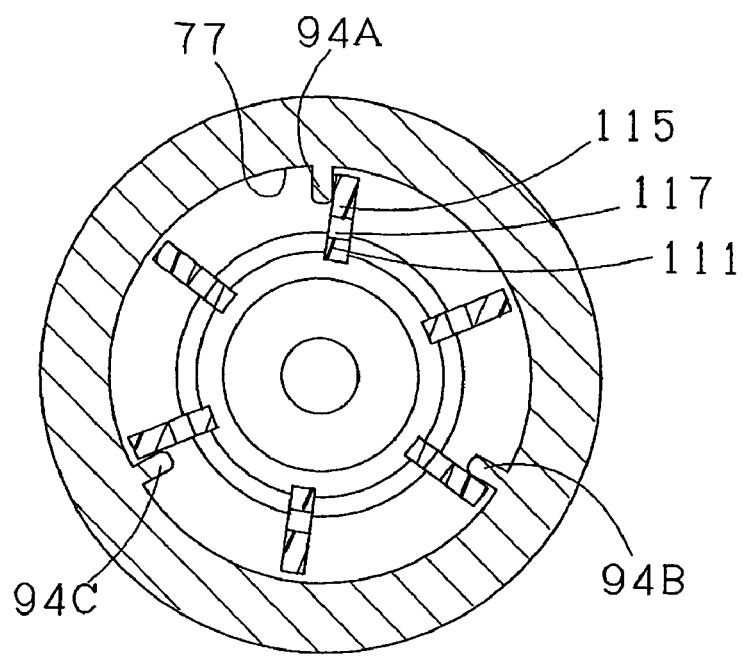
Figure 7A:
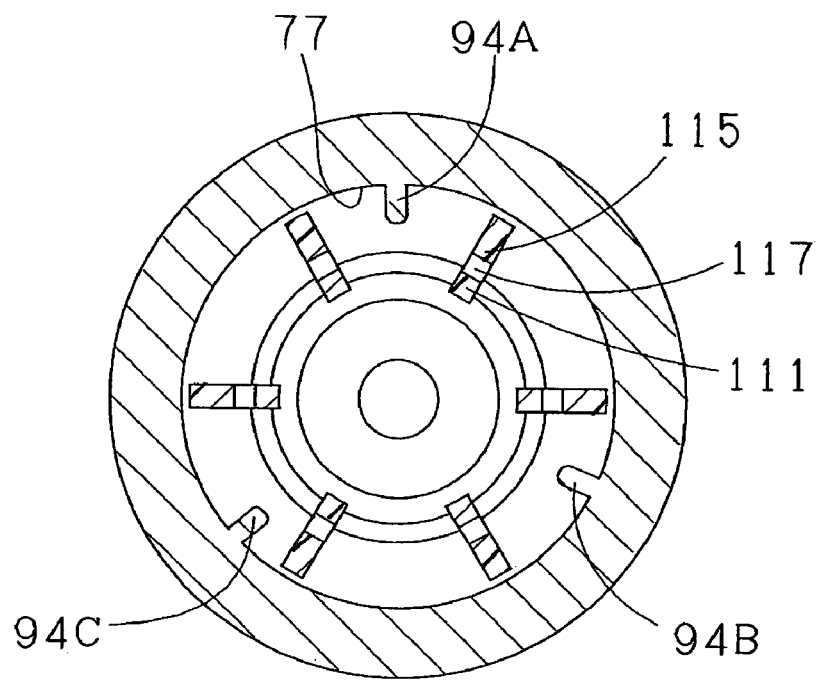
FIG. 7 (A) is an enlarged sectional view of a region of the internal check valve taken along the radial direction, and schematically showing another relationship between the valve body and the anti-rotation projections.
Figure 7B:
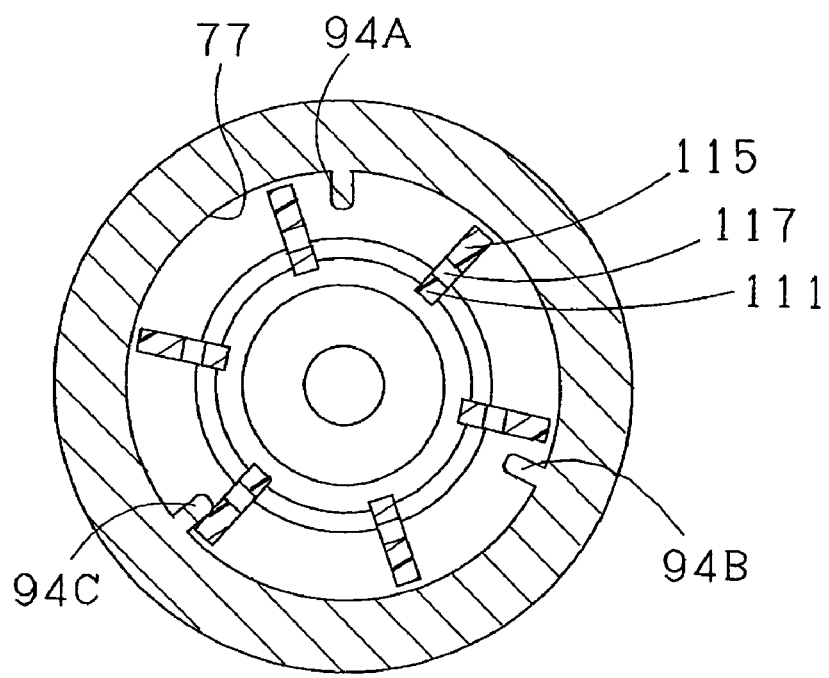

As shown in FIG. 6 (A), three anti-rotation ribs (a plurality of anti-rotation ribs) 94A, 94B, 94C may be arranged, in equally circumferentially spaced relation. Namely, each of the anti-rotation ribs 94A, 94B, 94C may be disposed at a circumferential spacing of 120°, namely a radial angle or central angle of 120° from adjacent ones. Here, the first slide portions 115 (first slide legs 111) are provided or disposed in equally circumferentially spaced relation (the number of the first slide portions 115 is double that of the anti-rotation ribs 94, each of the first slide portions 115 is disposed at the central angle of 60° from adjacent ones). In this arrangement, since all of three anti-rotation ribs 94A, 94B, 94C simultaneously abut the first slide portions 115 in a usual case, the anti-rotation ribs 94A, 94B and 94C and the first slide portions 115 are less worn at an early stage, thus durability of the internal valve 7 is improved (refer to FIG. 6 (B), all of anti-rotation ribs 94A, 94B, 94C simultaneously abut the first slide portions 115 also in a case that the valve body 95 rotates in a reverse direction). Or, as shown in FIG. 7 (A), three anti-rotation ribs 94A, 94B and 94C may be disposed in circumferentially spaced relation so as to define different spacings between adjacent ones. For example, two of the circumferential spacings therebetween are set the same and a reminder of the circumferential spacing therebetween is set different from them. Specifically, circumferential or angular spacings between the anti-rotation ribs 94A and 94B, and between 94B and 94C may be set the central angle of 115°, respectively, while a circumferential spacing between the anti-rotation ribs 94C and 94A may be set the central angle of 130°. Here, although the first slide portions 115 are equally spaced in the circumferential direction, the anti-rotation ribs 94 are not equally spaced (namely, unequally spaced) in the circumferential direction. So, in whichever directions the valve body 95 rotates, the first slide portions 115 abut not all of three anti-rotation ribs 94A, 94B, 94C, but one of the first slide portions 115 abuts only one of three anti-rotation ribs 94A, 94B, 94C. This abutment of the first slide portion 115 with one of the anti-rotation ribs 94 prevents the valve body 95 from rotating (refer to FIG. 7 (B)). Here, since only a part of three anti-rotation ribs 94A, 94B, 94C abuts the first slide portion 115, the valve body 95 exhibits a small sliding resistance to movement in an axial direction, and thereby responsiveness of the internal valve 7 can be improved. Meanwhile, each of the anti-rotation ribs 94 projects from the inner surface 77 so as to abut only an outward portion of the first slide leg 111 with respect to the support recess 117.

Figure 8:
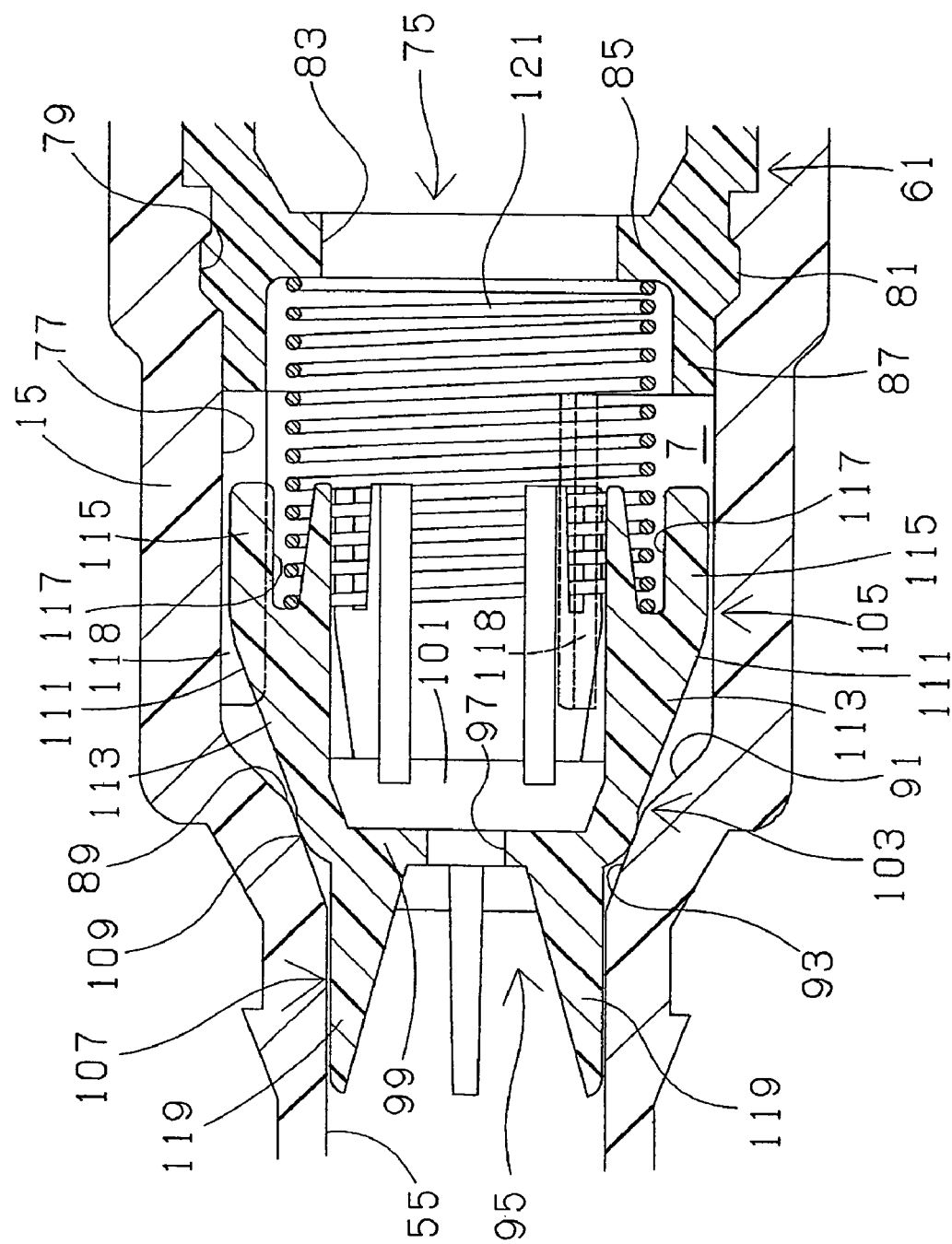
FIG. 8 is an enlarged sectional view showing another configuration of a region of an internal check valve.

In stead of providing the anti-rotation ribs 94 on the inner peripheral surface 77 of the valve housing 15, as shown in FIG. 8, there may be provided a plurality of anti-rotation projecting portions (anti-rotation projections) 118 extending integrally from a leading end or leading extreme end of the cylindrical portion 87 of the valve cap 75 in one axial direction, in circumferentially spaced relation. There may be provided, for example, three anti-rotation projecting portions 118 in similar circumferentially spaced relation to that of the anti-rotation ribs 94. The anti-rotation projecting portions 118 may be formed, for example, so as to extend to one axial end or one axial extreme end of the inner peripheral surface 77 of the valve housing 15, to just short of the one axial end or one axial extreme end of the inner peripheral surface 77, or to an axially middle portion or position of the first annular surface 91. Meanwhile, the anti-rotation projecting portion 118 or each of the anti-rotation projecting portions 118 is also formed so as to abut only the outward portion of the first slide leg 111 with respect to the support recess 117.

Figure 9:
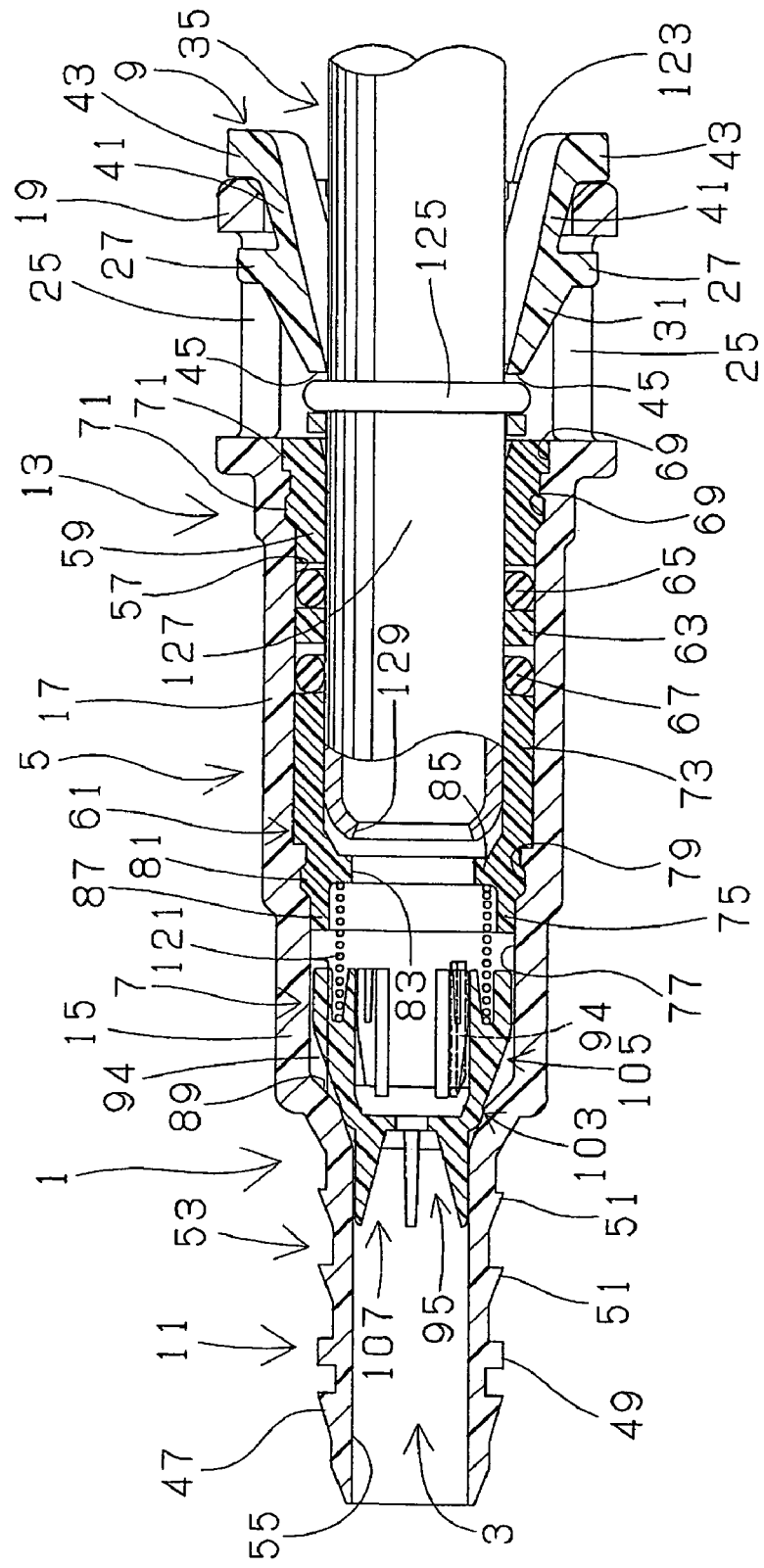
FIG. 9 is a sectional view showing that a pipe is connected to the valve connector.

As well shown in FIG. 9, a mating pipe, i.e. the pipe 35, for example, made of metal or resin is inserted into an opening or insertion opening 123 on an end of the retainer holding portion 19, more specifically, in the main body 31 of the retainer 9 from a side of the latching ends 43, 43 of the operating arms 41, 41, and is fitted in the valve connector 1. The pipe 35 has an inserting end portion 127 on one axial end thereof where an annular engaging projection 125 is formed on an outer peripheral surface. The pipe 35 is pushed, and fittingly inserted into the valve connector 1 or the connector housing 5 so that the annular engaging projection 125 advances radially expanding the main body 31 of the retainer 9 until the annular engaging projection 125 seats in the engaging slits 45, 45 in snap-engagement relation therewith. When the pipe 35 is correctly inserted in the connector housing 5, one axial end or one axial extreme end of the pipe 35 is located short of the valve cap 75 (on the other axial end with respect to the valve cap 75). The annular engaging projection 125 that seats and snap-engages in the engaging slits 45, 45 of the main body 31 of the retainer 9 blocks or limits further axial in-and-out movement of the pipe 35 with respect to the valve connector 1. That is, the pipe 35 is almost locked against relative axial movement in the valve connector 1 by the annular engaging projection 125 that seats and snap-engages in the engaging slits 45, 45. The inserting end portion 127 of the pipe 35 is inserted in the annular bush 59 and the tubular bush 61 without rattling, and a seal is formed between an outer peripheral surface of the pipe 35 and the inner peripheral surface 57 of the valve connector 1 by the first and the second O-rings 65, 67. By the way, the communication channel 83 of the valve cap 75 is formed to have a diameter generally equal to a flow-in opening 129 of the pipe 35 or a diameter slightly larger than the flow-in opening 129.

In the event of removing the pipe 35 from the valve connector 1, for example, the latching ends 43, 43 of the operating arms 41, 41 are pressed radially inwardly from outside to narrow a radial distance between the operating arms 41, 41, thus a radial distance between the engaging tabs 27, 27. And, thereby the engaging tabs 27, 27 are out of the engagement windows 25, 25, and the retainer 9 can be relatively pulled out of the connector housing 5. As the retainer 9 is relatively pulled out of the connector housing 5, the pipe 35 is also pulled out of the valve connector 1 or the connector housing 5 along with the retainer 9.

Figure 10:
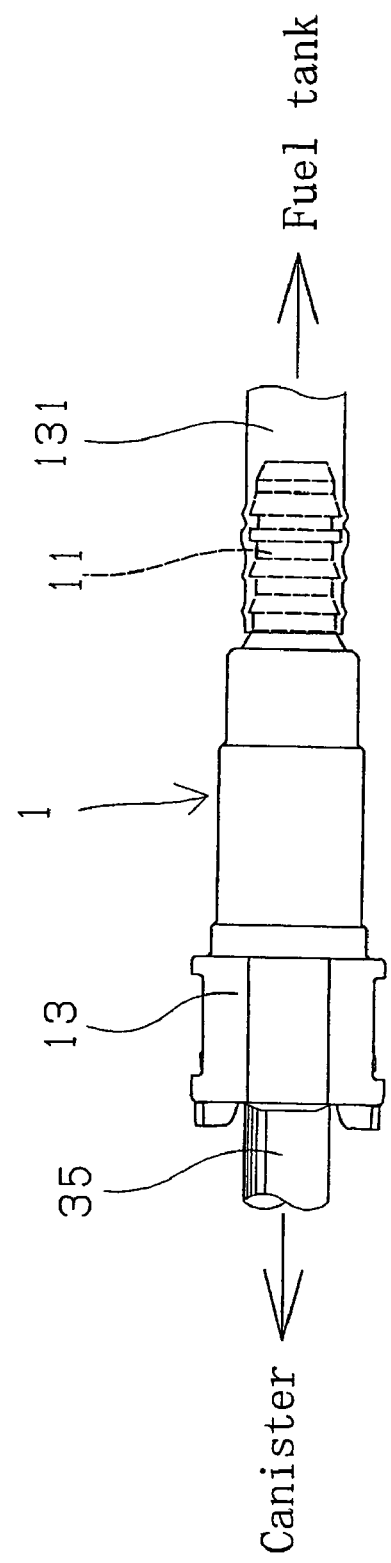
FIG. 10 is a view for explaining that the valve connector is used for evaporation piping.
Figure 11:
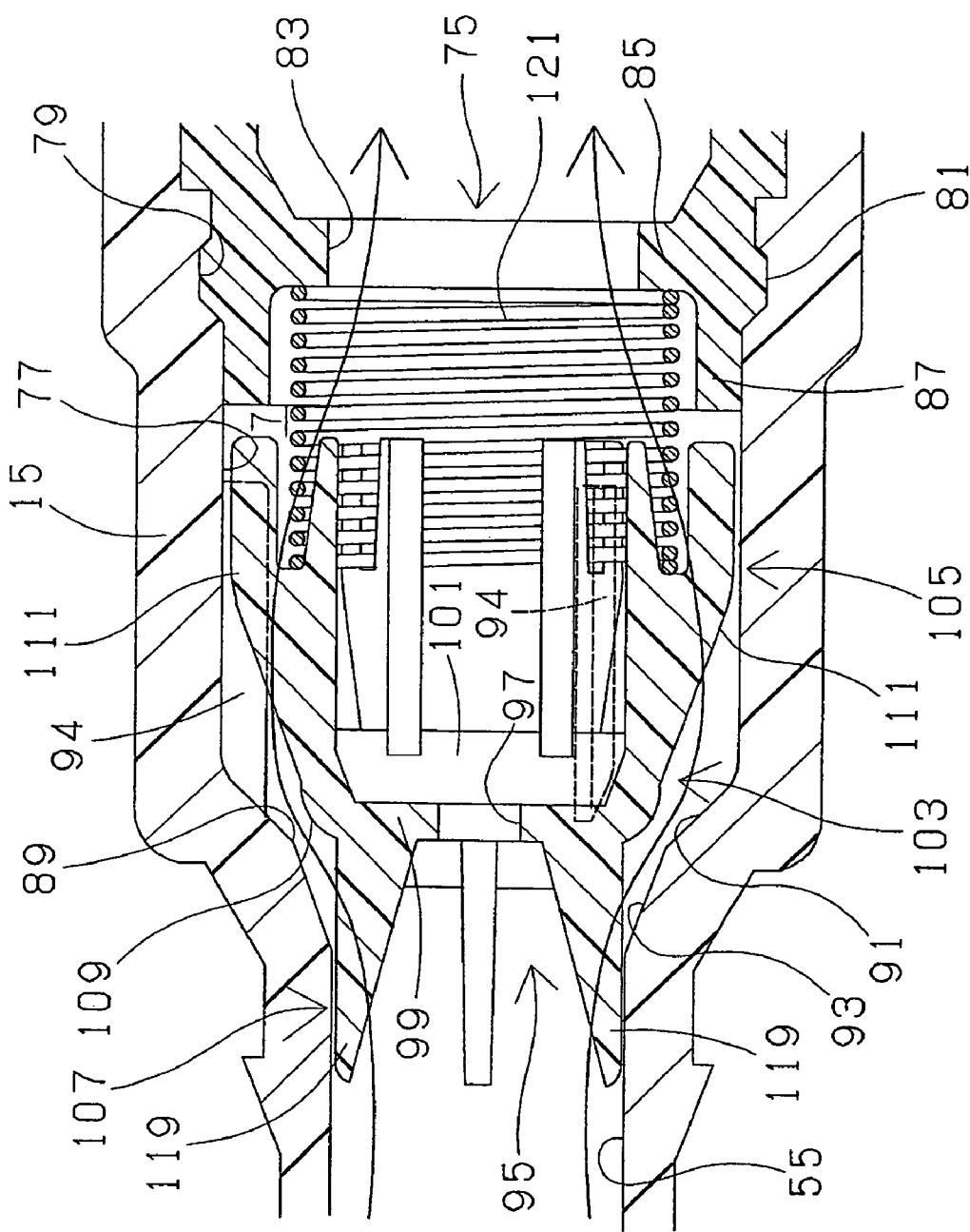
FIG. 11 is a view showing a state that the valve body is open.

As well shown in FIG. 10, the valve connector 1 may be used for an evaporation piping. Here, a resin tube 131 that is connected to a fuel tank is fitted on an outer periphery of the tube connecting portion 11 of the valve connector 1, the pipe 35 of a canister or a canister side is relatively inserted in the pipe inserting portion 13, and thereby the evaporation piping is constructed. In this construction, when a vapor pressure in the fuel tank increases, the valve body 95 moves or travels in the other axial direction against a spring force of the compression coil spring 121, as shown in FIG. 11. When the valve body 95 travels in the other axial direction and the connecting outer peripheral surface 109 of the closing portion 103 moves away from an axial center position of the second annular surface 93, a vapor passes through a large diameter annular gap between the outer peripheral surface or the connecting outer peripheral surface 109 of the closing portion 103 and the first annular surface 91 or the second annular surface 93, and flows in the valve housing 15. The vapor that flows in the valve housing 15 flows in the pipe 35 (the pipe 35 is not shown in FIG. 11) through the through-channel 83 of the valve cap 75 and the flow-in opening 129 of the pipe 35, and is sent to the canister. The valve body 95 may travel in the other axial direction until the first slide portions 115 of the first slide legs 111 abut the cylindrical portion 87 of the valve cap 75. Axial movement of the valve body 95 is accompanied by sliding motion of the first sliding legs 111 over the inner peripheral surface 77, and sliding motion of the second sliding legs 119 over the inner peripheral surface 55. Therefore, it is not feared that the valve body 95 tilts during traveling of valve body 95. And, as each of the second slide legs 119 is designed longer than an axial distance between the first slide leg 111 and the cylindrical portion 87 of the valve cap 75 when the valve body 95 is in a closed state, or longer than traveling distance of the valve body 95 in the axial direction, the second slide leg 119 does not slip out of the tube connecting portion 11 due to traveling of the valve body 95.

In the valve connector 1 of such configuration, the valve body 95 does not start moving or traveling in the other axial direction until the vapor pressure in the fuel tank increases to a predetermined value, namely a value of a minimum activation pressure of the valve body 95. So, if the valve body 95 is provided with a completely closed construction, the vapor cannot be sent toward the canister when a pressure in the fuel tank is low. However, even if the vapor pressure in the fuel tank is low, as the case may be, it is suitable to control the pressure in the fuel tank property by allowing the vapor to flow to the canister. Thus, the small through-bore 97 is formed in the disk portion 99 of the valve body 95 so as to allow the vapor to flow even when the pressure in the fuel tank is low. The small through-bore 97 is formed with a diameter about one-third to one-fifth the diameter of the through-path 3 of the tube connecting portion 11 or an abutting region of the second annular surface 93 with the connecting outer peripheral surface 109.

The valve connector according to the present invention exhibits a good responsiveness to change of vapor pressure, by being adapted, for example, in an evaporation piping for a motor vehicle.

What is claimed is:

1. A valve connector, comprising:
   a connector housing having a through-path, the connector housing being provided with a tube connecting portion on one axial end thereof and a pipe inserting portion on the other axial end thereof,
   an internal valve disposed in the connector housing for opening and closing the through-path, the internal valve having a valve seat surface defined in the connector housing, a valve body including a closing portion with an abutting surface for abutting with the valve seat surface on an outer peripheral portion of the closing portion, and a compression spring biasing the valve body toward the valve seat surface, the valve body being housed in the connector housing movably in an axial direction,
   wherein the valve body is provided with a plurality of guides, in circumferentially spaced relation, the guides are slidable and movable over an inner surface of the connector housing,
   wherein an anti-rotation mechanism is arranged between the valve body and a side of the connector housing for restraining the valve body from rotating with respect to the connector housing, the anti-rotation mechanism is in a form of a plurality of stationary anti-rotation projections in circumferentially spaced relation and extending radially inwardly with respect to the cylindrical inner surface of the connector housing so as to engage with the guides in a circumferential direction,
   wherein the number of the guides is greater than the number of the projections;
   wherein the valve body rotates in a predetermined angular range between a first position and a second position, in the first position the guide engages with the anti-rotation projection for preventing the valve body from rotating in one circumferential direction, and in the second position the guide engages with the anti-rotation projection for preventing the valve body from rotating in the other circumferential direction,
   wherein the connector housing includes a cylindrical inner peripheral surface at a position where the valve body is housed, a valve cap is fitted in the other axial end of the cylindrical inner peripheral surface, said valve cap has one axial end that bears the other axial end of the compression spring, and the anti-rotation projections are elongated and extend in the axial direction along the cylindrical inner peripheral surface.

2. The valve connector as set forth in claim 1, wherein the predetermined angular range is from 30° to 60°.

3. The valve connector as set forth in claim 1, wherein each of the guides includes a support recess, one axial end portion of the compression spring is received in the support recess, and the anti-rotation projection engages with a part of the guide radially outward of the support recess.

4. The valve connector as set forth in claim 1, wherein the guides are provided on the other axial end of the valve body, and the anti-rotation projection is provided integrally on the valve cap so as to engage with the guide in a circumferential direction.

5. The valve connector as set forth in claim 1, wherein a plurality of the anti-rotation projections are provided in circumferentially spaced relation.

6. The valve connector as set forth in claim 5, wherein the plurality of the anti-rotation projections and the plurality of the guides are equally spaced apart in the circumferential direction, respectively.

7. The valve connector as set forth in claim 5, wherein either ones of the anti-rotation projections and the guides are equally spaced apart in the circumferential direction, and the other ones of the anti-rotation projections and the guides are unequally spaced apart in the circumferential direction.

8. The valve connector as set forth in claim 5, wherein the anti-rotation projections are unequally spaced apart in the circumferential direction.

9. The valve connector as set forth in claim 4, wherein the anti-rotation projection extends to a position closely spaced from one axial end of the cylindrical inner peripheral surface.

10. The valve connector as set forth in claim 1, wherein the anti-rotation projection extends from one axial end generally to an axial center of the cylindrical inner peripheral surface.

11. The valve connector as set forth in claim 1, wherein the anti-rotation projection extends from one axial end of the cylindrical inner peripheral surface to a position closely spaced from the valve cap.

12. The valve connector as set forth in claim 1, wherein the guide is formed to extend for a longer distance than the distance that the valve body is able to move to the axial direction.

13. The valve connector as set forth in claim 9, wherein when the valve body is in a closed state, the other axial end of the anti-rotation projection is positioned to extend in the other axial direction beyond the other axial end of the guide.

* * * * *